Dec. 18, 1928.
A. E. DAVIS
TREE HOLDER
Filed Nov. 19, 1924
1,695,275
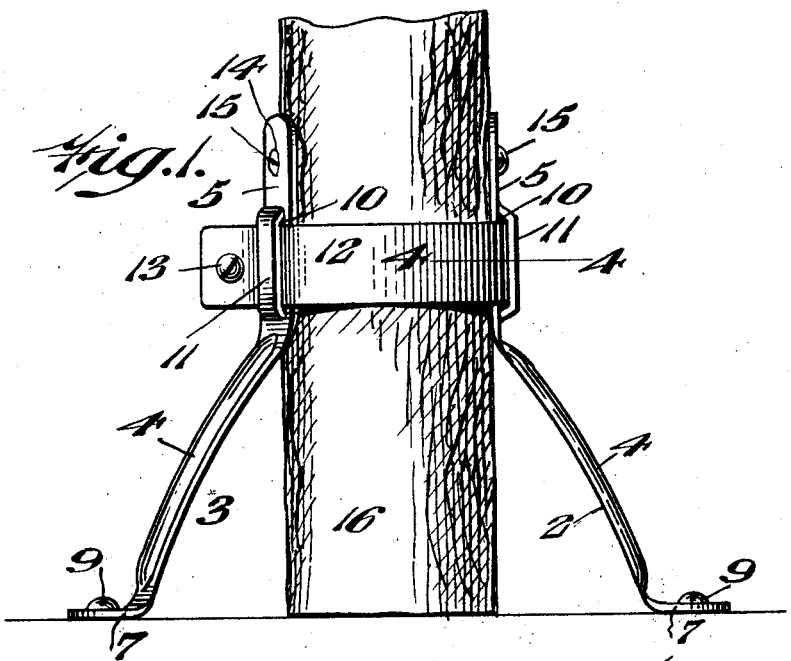
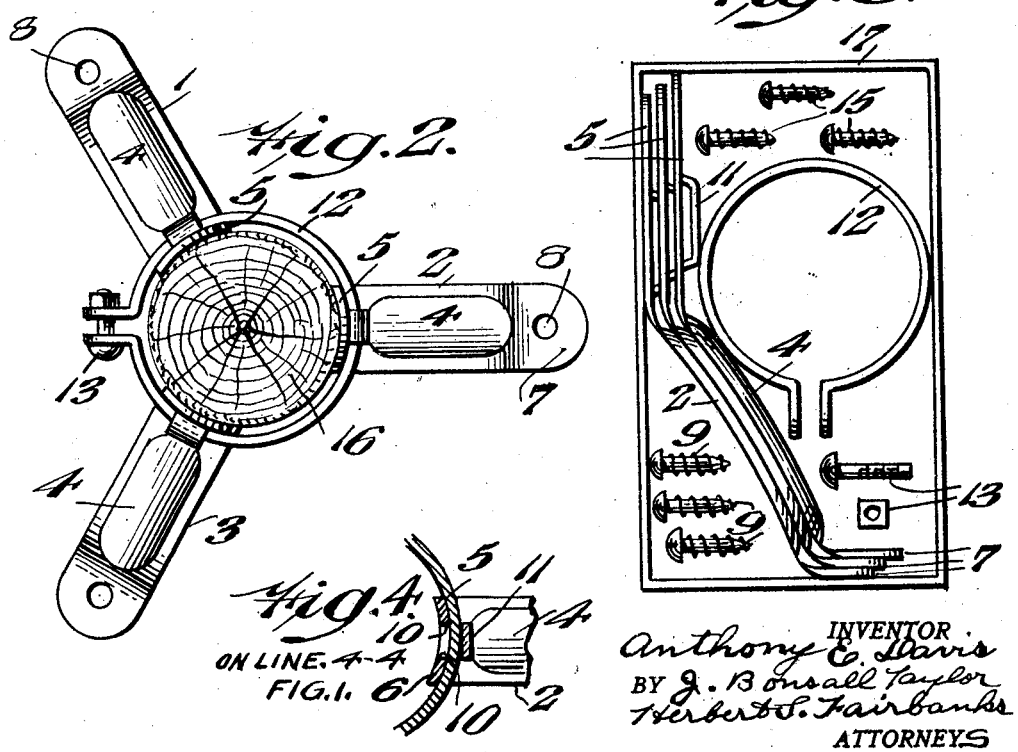
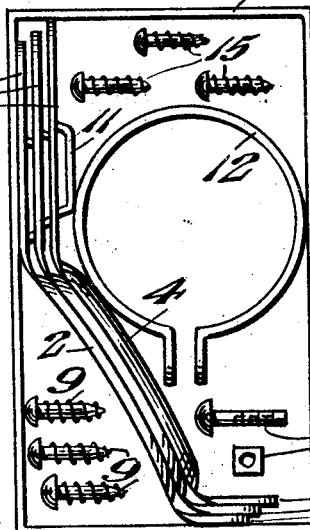
INVENTOR
Anthony E. Davis
BY J. Bonsall Taylor
Herbert S. Fairbanks
ATTORNEYS Patented Dec. 18, 1928.

1,695,275

UNITED STATES PATENT OFFICE.

ANTHONY E. DAVIS, OF PHILADELPHIA, PENNSYLVANIA.

TREE HOLDER.

Application filed November 19, 1924. Serial No. 750,726.

One of the main objects of this invention is to devise a novel construction of a tree holder which is especially adapted to be used with Christmas trees and which can be very economically manufactured.

Another object of the invention is to devise a tree holder which can be readily assembled and taken apart so that it can be shipped in a knock-down condition with consequent economy in packing and shipping.

With the above and other objects in view which will hereinafter appear, my invention comprehends a novel construction of a tree holder.

It further comprehends a novel construction of legs and novel means for securing them in assembled condition with respect to the tree or other article which they are to support.

Other novel features of construction and advantage will hereinafter more clearly appear in the detailed description and the appended claim.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 is an elevation of a tree holder, embodying my invention, in assembled condition with an article which it supports.

Figure 2 is a top plan view of the construction seen in Figure 1.

Figure 3 is a view of the holder in a knock-down condition in its carton or box.

Figure 4 is a section on line 4—4 of Figure 1.

Similar numerals of reference indicate corresponding parts.

Referring to the drawings:

1, 2 and 3 are the legs of a tree holder embodying my invention. Each leg is of the same construction and therefore a description of one will suffice for all. Each leg is formed of sheet material, preferably metal, with is deflected, as at 4, in order to reinforce it and permit the use of lighter gauge metal.

Each leg at its upper end is provided with a tree engaging portion 5, the inner face of which is preferably curved as seen at 6 in Figure 4. The legs are bent intermediate their ends so that their lower portions incline outwardly and downwardly, and at their lower ends they terminate in laterally extending base flanges 7 which may be apertured as at 8 in order to receive fastening devices 9, such as screws, nails or equivalent fastening devices. The tree engaging portion of each leg is cut as at 10 to provide for the guide band 11 being pressed outwardly and thereby form between the guide band and the tree engaging portion 5 a space to receive a split clamping band 12 which has a working fit therein. The band 12 is of metal and has its free ends laterally deflected and apertured to receive an adjustable fastening device 13, such, as for example, the bolt and nut illustrated. Each leg near the upper end of the tree engaging portion is apertured, as at 14 to receive a fastening device 15 such as for example, a screw, nail or equivalent fastening device. 16 designates the tree or other article to be supported.

The tree holder can be taken apart and shipped in a knock-down condition in a container 17 of much smaller size than would be necessary if the device had to be packed in its assembled condition.

The support is assembled by sliding the legs on the clamping band and positioning the legs so as to form a tripod. In order to accommodate the supports to different sizes of tree trunks, the band can be expanded or contracted as may be desired. The fastening device 13 is then applied and the fastening devices 15 are driven or screwed through the openings 14 into the trunk of the tree so that a rigid support for the tree is obtained.

When the tree is to be thrown away, the fastening devices 15 can be removed and also the fastening device 13, whereupon the tree holder can be put away for the next year, or it can be taken apart and packed in a box so that it takes up but a minimum of storage space.

When the device is shipped, all of the parts are assembled in a knock down condition within the container 17, to which a suitable cover is secured.

All of the parts can be very economically manufactured from sheet metal by a stamping operation and the legs can be shaped in a single operation.

The base or foot flanges 7 can be of any desired dimensions in order to form a firm supporting surface, and the angles of the legs 2 can be varied by simply bending them.

I am aware that it has heretofore been proposed in the Downey Patent, 1,329,513, granted Feb. 3, 1920 to form a bottle support of two curved members, each of which is provided with a pair of supporting legs and to thread a flexible non-metallic band through the two members in order to clamp them around the bottle in such a manner that a portion of the clamping band will lie between the members and the bottle and act as a cushion.

My present invention is clearly differentiated from the construction aforesaid, since in accordance with my present invention, I simply employ a plurality of legs having guide members formed from them into which can be threaded a flexible clamping member so that by contracting and expanding the clamping member the support is adapted for trees having different sizes of trunks. In this manner a very rigid support is provided, and when it has performed its function with the Christmas tree and removed from the tree, it can be taken apart and assembled so that the legs nest one within the other and the other parts can be assembled with the nested legs so that the device can be packed in a very small compass.

If desired the fastening device can be driven through the legs into the tree to provide a more rigid support.

Having thus described my invention, what I claim as new and desire to secure by Letters Patent is:

A tree holder, comprising legs each being formed of sheet metal with a tree contacting portion and downwardly and outwardly inclined leg portions and with the tree contacting portion having guide bands deflected therefrom, a flexible clamping member passing between said guide bands and the tree contacting portions, fastening devices adapted to pass through the legs and engage the tree, and securing means for said clamping member.

ANTHONY E. DAVIS.